Feb. 14, 1950        G. E. OLSSON        2,497,368

FREEWHEEL HUB FOR BICYCLES

Filed Feb. 26, 1947

INVENTOR.
G. E. Olsson
BY
ATTORNEYS

Patented Feb. 14, 1950

2,497,368

UNITED STATES PATENT OFFICE 2,497,368

FREEWHEEL HUB FOR BICYCLES

Gustaf Emil Olsson, Varberg, Sweden

Application February 26, 1947, Serial No. 730,908
In Sweden October 16, 1945

11 Claims. (Cl. 192—6)

The present invention relates to bicycle freewheel hubs, more particularly it relates to such hubs which are provided with a back-pedalling brake, wherein a split brake sleeve is expanded and pressed against the hub shell by a coupling sleeve which is displaced inwardly in the brake sleeve upon back-pedalling, said coupling sleeve having a conical surface adapted to engage a corresponding conical surface on one end of the brake sleeve, while the other end of the brake sleeve has a conical surface which upon braking is pressed against a corresponding conical surface on a brake cone.

Freewheeling hubs of the type described have a serious disadvantage in that the brake sleeve and the inside of the hub shell, respectively, wear irregularly, the wear being substantially concentrated at the two ends of the brake sleeve.

The main object of the present invention is to remove this disadvantage in the hitherto known freewheel hubs of the type mentioned.

An additional object is to provide a freewheeling bicycle hub including a brake of extremely simple construction and one that is more economical to manufacture.

Other objects and advantages will be apparent from the following description and the drawings.

The invention consists principally in providing between the ends of the brake sleeve a further conical surface adapted to be engaged by a corresponding brake cone.

The invention will be best understood by reference to the accompanying drawing, showing a preferred form of construction and in which.

Figure 1:
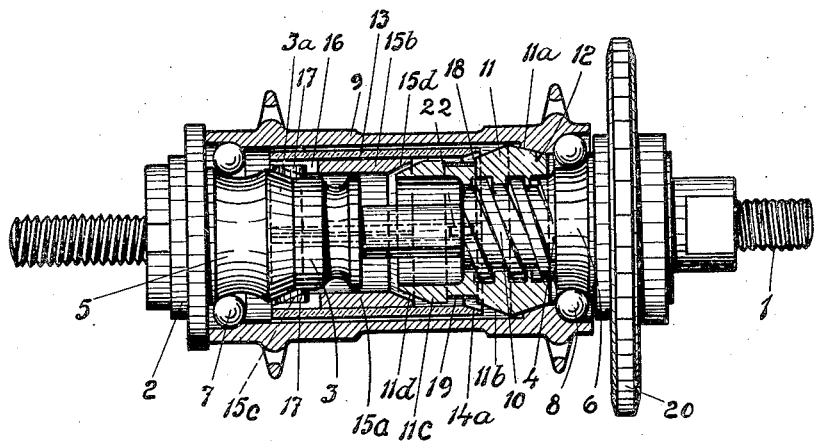
Fig. 1 illustrates partly in section and partly in elevation a freewheel hub according to the invention.
Figure 3:
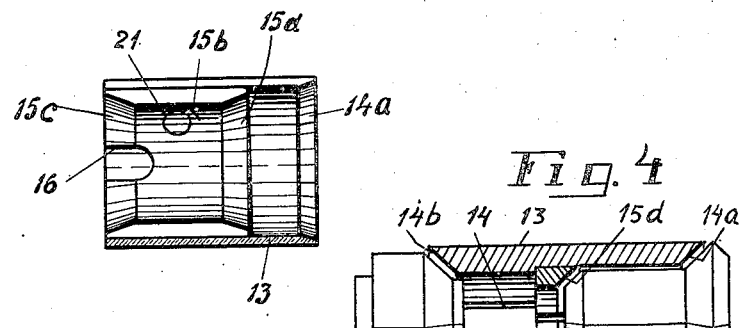
Fig. 3 is a section on the line III—III of Fig. 2.
Figure 2:
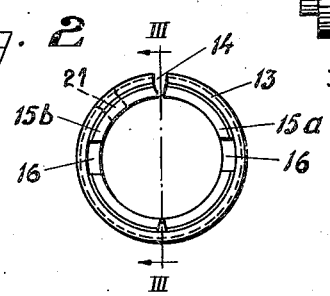
Fig. 2 is an end view of a brake sleeve aggregate of the type shown in Fig. 1.

The freewheel hub shown in Figs. 1–3 in the drawing includes shaft 1 for fastening the hub on to the rear wheel forks of a bicycle. At one end of the shaft 1 there is fixed a brake arm 2, the forward directed, and therefore in Fig. 1, the invisible end of which engages one horizontal rear wheel fork arm in order to hold the brake cone 3 against rotation in relation to the bicycle frame. At the other end of the shaft 1 a drive 4 is rotatably but non-displaceably mounted in the known manner, and to which drive 4 a chain wheel 20 is fixed. The brake cone 3 and the drive 4 are provided with ball races 5 and 6, respectively, for balls 7 and 8, respectively, on which races a hub shell 9 is mounted.

The drive 4 includes an inwardly directed cylindrical part having steeply pitched threads 10 therein which engage a coupling sleeve 11. On this coupling sleeve there is a conical portion 11a tapering outwardly towards the chain wheel 20. When the chain wheel 20 is driven in the forward direction said portion 11a is pressed to a fixed frictional engagement with a corresponding conical portion 12 on the side of the hub shell adjacent the threads 10 of the drive 4 in such a way that the hub shell in the known manner takes part in the rotation of the chain wheel 20 for driving the bicycle.

The coupling sleeve 11 has also a conical portion 11b connected to the conical portion 11a but tapering in the opposite direction and a tubular extension 11c connected to the portion 11b, the inner end of which extension presents a conical portion 11d which tapers in the same direction as the portion 11b and has the same apex angle.

The brake cone 3 inwardly of the ball race 5 is provided with a conical portion 3a which is turned inwardly towards the middle of the hub and to which a tubular extension of the brake cone is connected. Over the tubular extensions of the brake cone 3 and the coupling sleeve 11 there is disposed a brake sleeve aggregate as shown in detail in Figs. 2 and 3.

This brake sleeve aggregate comprises an outer sleeve or ring 13 made of a material suitable for a frictional engagement with interior of the hub shell. The ring 13 is split at 14 and at that end which surrounds the coupling sleeve 11 it is provided with a conical surface 14a having the same inclination as the conical portion 11b on the coupling sleeve. In the brake sleeve ring 13 there is introduced an inner sleeve or ring of hard wear-resisting material, consisting of two halves 15a and 15b. The inner ring 15a, 15b is a little more than half as long as the outer ring 13, and its one half is by means of a pin or rivet 21 non-rotatably fixed to the outer ring 13 in such a manner that the one end of the inner ring and the outer ring will coincide in axial direction. At the outer end of the outer ring 13 the inner ring coinciding with the outer ring 13 presents a pair of recesses 16 which are engaged by a pair of pins 17 inserted in the brake cone 3 in order to hold the inner ring and thereby the outer ring 13 against rotation in relation to the bicycle frame. The inner ring 15a, 15b has at its outer end a conical portion 15c adapted to engage the conical portion 3a of the brake cone 3 and at its inner end said inner ring has a conical portion 15d adapted to engage the conical portion 11d of the coupling sleeve 11.

In a peripheral notch 18 of the coupling sleeve 11 there is inserted a split springy sleeve or clip 19 provided with a lug 22 engaging the slit 14 of the outer brake ring 13 and tending with a low friction to non-rotatably maintain the coupling sleeve 11 in relation to the brake aggregate in such a manner that the coupling sleeve 11 does not simply take part in the rotation of the drive 4 but is moved in one direction or the other on the threads 10 of the drive.

When pedalling backwards so that the chain wheel 20 tends to rotate in the direction opposite to the driving direction the coupling sleeve 11 owing to the low friction between the coupling sleeve and the spring clip or sleeve 19 is displaced inwardly in the hub along the threads 10 of the drive 4.

The displacement of the coupling sleeve 11 inwardly proceeds until the conical portions 11b and 11d of the coupling sleeve simultaneously engage the conical portions 14a and 15d respectively, of the outer ring 13, of the brake sleeve aggregate and the composite inner ring 15a, 15b thereof, whereby the brake sleeve aggregate 13, 15a, 15b is displaced to the left in respect to Fig. 1 until the conical portion 15c of the inner ring 15a, 15b bears against the conical portion 3a of the brake cone 3. Upon continued displacement inwardly of the coupling sleeve 11 the split brake rings 13, 15a, 15b are expanded so that the outer surface of the brake ring 13 engages the inside of the hub shell 9 and brakes the bicycle.

In order that the pair of conical surfaces 3a, 15c may withstand the combined or total axial pressure of both pairs of the conical surfaces 11b, 14a and 11d, 15d under exertion of an equally great radial pressure against the hub shell 9 as one of said last-mentioned pairs, the first-mentioned pair 3a, 15c, in the embodiment shown, has been provided with a suitably greater cone apex angle than the other two pairs.

Figure 4:
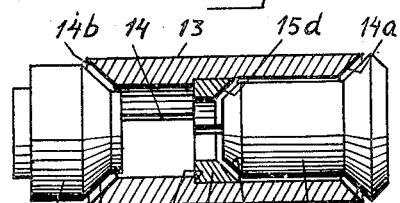
Fig. 4 illustrates in section a modified form of brake sleeve and includes the cooperating brake cones in elevation.

In the simplified, schematic embodiment shown in Fig. 4, the inner sleeve 15a, 15b is replaced by a simple split ring 15 having one conical surface 15d only, engaging the conical surface 11d of the coupling sleeve 11 and bearing against a counterbore or recess 23 in the inner surface of the split brake sleeve 13 substantially midway between its ends. In this embodiment the split brake sleeve 13 is provided with conical surfaces 14a, 14b at both its ends that respectively cooperate with the conical surfaces 11b of the coupling sleeve 11 and 3a of the brake cone 3.

The radial pressure against the brake sleeve 13 is therefore exerted not only at the ends but also at one or more places between the ends of the sleeve thereby preventing irregular wear of the outer surface of said brake sleeve and the inner surface of the hub.

The invention is not limited to the illustrated and described form of construction as modifications can be made within the scope of the appended claims. The brake cone can for instance be provided with two conical surfaces like the coupling sleeve.

What I claim is:

1. In a wheel structure, a hollow hub, a shaft rotatably supporting said hub, a brake member fixed to said shaft, a coupling member movable axially on said shaft, a split brake sleeve expansible into contact with the interior of the hub, conical surfaces at both ends and the medial portion of the brake sleeve, and conical surfaces on the brake and coupling members coacting with each of the three first mentioned conical surfaces and operable, upon axial movement of the coupling member, to expand the brake sleeve uniformly from end to end against the hub.

2. A wheel structure as claimed in claim 1 wherein said brake sleeve includes two split rings arranged one within the other and on which the first mentioned conical surfaces are provided.

3. A wheel structure as claimed in claim 1 wherein said brake sleeve includes two split rings arranged one within the other and on which the first mentioned conical surfaces are provided, the inner ring being formed in two separate parts.

4. A wheel structure as claimed in claim 1 wherein said brake sleeve includes an outer split ring and a two part inner ring, the inner ring extending from one end of the outer ring to a point substantially midway the ends thereof, the first mentioned conical surfaces being formed on both ends of the inner ring and on the opposite end of the outer ring.

5. A wheel structure as claimed in claim 1 wherein said brake sleeve includes an outer split ring and a two part inner ring arranged within the outer ring, and means non-rotatably securing one of the inner ring parts to said brake member.

6. A wheel structure as claimed in claim 1 wherein two of the first mentioned conical surfaces are disposed at substantially the same inclination and the third of the first mentioned conical surfaces is inclined in the direction opposite the first two, the third conical surface having a greater apex angle than the other two surfaces.

7. A wheel structure including a hollow hub, a shaft disposed coaxially within said hub, a brake member on the shaft within and adjacent one end of the hub, a drive member on the shaft within and adjacent the opposite end of the hub, bearing means interposed between the respective opposite ends of the hub and the respective brake and drive members, said drive member having threads thereon extending within the hub inwardly of the bearing means adjacent thereto, said brake member having inwardly tapered coned surfaces inwardly of the adjacent bearing means thereadjacent, an internally threaded coupling member surrounding the shaft and in engagement with the threads on the drive member, said coupling member having longitudinally spaced inwardly tapering conical surfaces thereon and being axially movable relative to the hub, an expansible brake sleeve concentrically disposed within the hub between the inner surface thereof and the shaft, said brake sleeve having conical surfaces at the opposite ends thereof and a conical surface within the medial portion thereof so that upon axial movement of the coupling member the spaced conical surfaces on the drive member and the surfaces on the brake member coact with the surfaces on the brake sleeve to uniformly expand the sleeve against the hub.

8. A wheel structure as defined in and by claim 7, wherein the brake sleeve has oppositely tapered surfaces at its opposite ends and is internally counterbored for a distance slightly in excess of one half the internal extent thereof, and a split ring disposed within the counterbore and which split ring has a conical surface tapering in the same direction as the conical surface formed at the end of the sleeve having the largest internal diameter.

9. A wheel structure as defined in and by claim 7, wherein the brake sleeve has a slit therein and the coupling member is provided with a peripheral groove intermediate the conical surfaces thereon, and a split spring sleeve disposed within the groove, said sleeve having a lug projecting therefrom engaging the slit in the brake sleeve to non-rotatably maintain the coupling sleeve in relation to the brake sleeve to constrain the same for axial movement on the threads provided on the drive member.

10. A wheel structure as defined in and by claim 7, wherein the brake sleeve is an aggregate comprising an outer ring having a tapered surface at one end thereof and a two-part inner ring that is shorter than the outer ring and disposed within the same, one of said parts being fixed to the outer ring and the said inner ring having oppositely tapered surfaces at opposite ends thereof, one end of the inner ring terminating the same plane as the end of the non-tapered end of the outer ring, and a conical surface on the inner ring adjacent the non-tapered end of the outer ring having a greater apex angle than the remaining conical surfaces of the brake sleeve aggregate.

11. A wheel structure as defined in and by claim 7, wherein lugs project outwardly of the brake member and wherein the brake sleeve has recesses therein receiving said lugs to non-rotatably couple the brake sleeve with the brake member.

GUSTAF EMIL OLSSON.

REFERENCES CITED

The following references are of record in the file of this patent:

UNITED STATES PATENTS

| Number | Name | Date |
| --- | --- | --- |
| 1,026,972 | Carter | May 21, 1912 |

FOREIGN PATENTS

| Number | Country | Date |
| --- | --- | --- |
| 7,192 | Great Britain | June 1, 1903 |
| 428,621 | Germany | July 1, 1924 |